(12) United States Patent
Carlson et al.

(10) Patent No.: US 6,534,128 B1
(45) Date of Patent: Mar. 18, 2003

(54) INKS AND OTHER COMPOSITIONS INCORPORATING LOW VISCOSITY, RADIATION CURABLE, POLYESTER URETHANE OLIGOMER

(75) Inventors: James G. Carlson, Lake Elmo, MN (US); Jeffrey T. Anderson, Lake Elmo, MN (US); Caroline M. Ylitalo, Stillwater, MN (US); Ronald K. Thery, New Brighton, MN (US); Richard L. Severance, Stillwater, MN (US); Jennifer L. Lee, St. Paul, MN (US); Dong Wu, Woodbury, MN (US); William J. Hunt, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/711,346

(22) Filed: Nov. 9, 2000

(51) Int. Cl.[7] .............................. C08F 2/46; B05D 1/32; C09D 11/00; C09D 11/02
(52) U.S. Cl. .................... 427/466; 427/511; 522/90; 522/96; 522/97; 522/81; 522/83; 347/1
(58) Field of Search .............................. 522/90, 96, 97, 522/81, 83; 347/1; 427/511, 466

(56) References Cited

U.S. PATENT DOCUMENTS

| | | | | |
|---|---|---|---|---|
| RE29,131 E | * | 2/1977 | Smith et al. .................... | 522/90 |
| RE30,212 E | * | 2/1980 | Carder .................. | 106/287.25 |
| 4,188,472 A | | 2/1980 | Chang .......................... | 528/75 |
| 4,264,757 A | * | 4/1981 | Park ............................ | 522/96 |
| 4,303,924 A | | 12/1981 | Young, Jr. .................... | 346/1.1 |
| 4,340,497 A | | 7/1982 | Knopf ................. | 252/188.3 R |
| 4,555,449 A | * | 11/1985 | Koleske et al. .......... | 252/62.54 |
| 4,618,635 A | * | 10/1986 | Osborn et al. .............. | 524/113 |
| 4,847,329 A | | 7/1989 | Koleske et al. .............. | 525/162 |
| 4,874,799 A | | 10/1989 | Hung et al. .................... | 522/96 |
| 4,978,969 A | | 12/1990 | Chieng | |
| 5,115,025 A | | 5/1992 | Koleske et al. .............. | 525/162 |
| 5,179,183 A | | 1/1993 | Koleske et al. .............. | 526/301 |
| 5,275,646 A | | 1/1994 | Marshall et al. .......... | 105/20 B |
| 5,376,169 A | | 12/1994 | Hotomi et al. ................. | 106/23 |
| 5,703,141 A | | 12/1997 | Jin ............................... | 522/97 |
| 5,981,113 A | | 11/1999 | Christian | |
| 6,114,406 A | | 9/2000 | Caiger et al. | |

FOREIGN PATENT DOCUMENTS

| | | | |
|---|---|---|---|
| EP | 0 590 889 A2 | 4/1994 | |
| EP | 0 465 039 B1 | 1/1995 | ........... C09D/11/00 |
| EP | 0 658 607 A1 | 6/1995 | |
| EP | 0 540 203 B1 | 12/1996 | ........... C09D/11/00 |
| EP | 0 997 508 A1 | 5/2000 | |
| JP | 50 09259 A | 1/1993 | |
| JP | 53 20287 A | 12/1993 | |
| WO | WO 98/27171 | 6/1998 | ........... C09D/11/10 |
| WO | WO 99/06888 | 2/1999 | ........... G03F/7/027 |
| WO | WO 99/29787 | 6/1999 | ........... C09D/11/00 |
| WO | WO 99/29788 | 6/1999 | ........... C09D/11/00 |

* cited by examiner

Primary Examiner—Susan W. Berman
(74) Attorney, Agent, or Firm—Scott A. Bardell (57) ABSTRACT

Low viscosity, radiation curable urethane oligomer, preferably a radiation curable polyester urethane oligomer, that can be incorporated into radiation curable ink compositions. Preferred embodiments are suitable for ink jetting applications. The ink jettable embodiments are particularly well-suited for use in piezo ink jet printers. The viscosity characteristics of the compositions are such that conventional solvent is not required in order to satisfy the requisite low ink jet viscosity specifications. The oligomer generally is a reaction product of ingredients comprising an aliphatic polyisocyanate; and a radiation curable, polyester alcohol comprising one or more radiation curable moieties, one or more hydroxyl moieties, and one or more ester moieties.

29 Claims, 3 Drawing Sheets

INKS AND OTHER COMPOSITIONS INCORPORATING LOW VISCOSITY, RADIATION CURABLE, POLYESTER URETHANE OLIGOMER

FIELD OF THE INVENTION

The present invention relates to radiation curable printing inks. More specifically, the present invention relates to radiation curable printing inks of ink jettable viscosities that incorporate a radiation curable diluent and a radiation curable, polyester polyurethane oligomer having atypically low viscosity characteristics.

BACKGROUND OF THE INVENTION

Inkjet imaging techniques have become very popular in commercial and consumer applications. Ink jet printers operate by ejecting ink onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers also are capable of forming three-dimensional objects as well, which is a capability suitable in applications such as rapid prototyping.

Thermal ink jet printers and piezo inkjet printers are the two main types of ink jet systems in widespread use today. For both approaches, inks must meet stringent performance requirements in order for the inks to be appropriately jettable and for the resultant printed features to have the desired mechanical, chemical, visual, and durability characteristics. In particular, inks must have relatively low viscosity when jetted, yet must be able to form accurate, durable images on the desired receiving substrate. For example, a typical ink for thermal ink jetting must typically have a viscosity in the range of 3 to 5 centipoise at 25° C., while piezo inks must typically have a viscosity in the range of 3 to 30 centipoise at the printhead temperature. The need to use low viscosity inks makes it challenging to obtain printed features with good mechanical, chemical, visual, and durability characteristics.

Solvent-based and water-based jettable inks are well known. A typical water-based ink generally comprises water, a colorant, which may be a dye and/or a pigment, one or more co-solvents, and one or more additives that are included to enhance the performance of the ink. Representative examples of such additives include one or more colorants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Water-based inks have drawbacks. For industrial applications, drying is energy and equipment intensive. Drying water also takes time, and the printed material needs to be handled carefully during the relatively lengthy drying period. Water-based inks are also compatible only with a limited range of substrates, typically those on which the water is absorbed to some degree. Images formed using water-based inks typically require a protective overlaminate for outdoor applications.

Instead of water, other solvent-based inks include relatively volatile, organic solvents. Such inks dry more rapidly and easily than aqueous inks. However, such solvents may be toxic, flammable, or the like, requiring careful handling. These inks also tend to be compatible with only a limited range of substrates.

In order to avoid using a conventional solvent, ink compositions incorporating a radiation curable, polymerizable diluent have been developed. The diluent not only functions as a solvent, but also functions as a viscosity reducer, as a binder when cured, and as a crosslinking agent. In the uncured state, these compositions have a low viscosity and are readily jetted. However, the polymerizable monomers readily crosslink upon exposure to a suitable source of curing energy, e.g., ultraviolet light, electron beam energy, and/or the like, to form a crosslinked polymer network. Depending upon the kind of monomers incorporated into the diluent, the resultant network may provide the printed features with durability, flexibility, elasticity, gloss, hardness, chemical resistance, stiffness, combinations of these, and the like.

Reactive diluents formed from radiation polymerizable monomers have some drawbacks. First, printed features formed from these materials might have a tendency to shrink when cured. Further, the adhesion, weatherability, resilience, toughness, flexibility, dot gain, and the like also may not be as good as is desired. Accordingly, previous reactive diluents have incorporated radiation curable oligomers in attempts to improve one or more of these characteristics. The use of urethane oligomers, particularly polyester urethane oligomers would be greatly desired inasmuch as such urethane materials tend to have excellent durability, weatherability, resilience, adhesion compatibility with a wide range of substrates, flexibility, and/or the like. However, adding an oligomer to the reactive diluent tends to cause the viscosity of the reactive diluent to increase. Polyester urethane oligomers, in particular, tend to have relatively high viscosity characteristics that increase as the urethane content of the oligomer is increased. The high viscosity associated with these oligomers is a serious drawback for ink jetting applications, where low viscosity is critical to jettability. Other urethane oligomers, particularly those containing ether groups, might have low viscosity, but suffer from limited compatibility with different kinds of substrates and poor weatherability characteristics.

SUMMARY OF THE INVENTION

The present invention provides a low viscosity, radiation curable urethane oligomer, preferably a radiation curable polyester urethane oligomer, that can be incorporated into radiation curable ink compositions. Preferred embodiments are suitable for ink jetting applications. The ink jettable embodiments are particularly well-suited for use in piezo ink jet printers. The viscosity characteristics of the compositions are low enough so that conventional solvent is not required in order to satisfy the requisite low ink jet viscosity specifications.

The oligomers of the present invention also provide inks with good adhesion to a wide range of different substrates, including the commonly used, nonporous, polymeric substrates used for outdoor signing applications. Such substrates may be films based upon polyvinyl chloride, poly (meth)acrylates, polyurethanes, polyolefins, alkyd resins, combinations of these, and the like. In particular, the oligomers provide good adhesion to polymethyl methacrylate substrates, which are typically difficult to adhere to, yet are highly desirable for outdoor applications. While not wishing to be bound by theory, it is believed that the polyester components, especially polycaprolactone ester components of the oligomers, helps both to reduce viscosity of the oligomer and to promote adhesion to these substrates. The combination of low viscosity, broad range compatibility with many substrates, and weatherability is atypical of conventional polyester urethane oligomers.

Preferred embodiments of the low viscosity, radiation curable urethane oligomers are transparent and colorless, making them readily compatible with colorants that might be incorporated into ink compositions of the present invention. Preferred embodiments may also be prepared from weatherable ingredients, making the oligomers and resultant ink compositions very well suited to outdoor applications. The oligomers also enhance the flexibility of cured ink compositions, allowing the inks to conform to irregular or moving surfaces. In addition to ink jet applications, the compositions of the present invention may also be used in a wide variety of other coating applications such as screen printing, clear coats, varnishes, paints, stains, and the like.

In one aspect, the present invention relates to a radiation curable ink jettable ink composition. The ink compositions includes an oligomer that is a reaction product of ingredients comprising an aliphatic polyisocyanate comprising two or more isocyanate groups; and a radiation curable alcohol comprising one or more radiation curable moieties, one or more hydroxyl moieties, and one or more polycaprolactone ester moieties.

In another aspect, the present invention relates to a printing ink with an ink jettable viscosity. The ink comprises a reactive diluent and a radiation curable polyester urethane oligomer. The oligomer is a reaction product of ingredients comprising a polyisocyanate and a radiation curable polyester alcohol. The alcohol comprises at least one radiation curable moiety, at least one hydroxyl group, and a polyester moiety comprising at least two ester groups. Preferably, the oligomer has a viscosity to mass index below about 25:1.

In another aspect the present invention relates to a method of making a printing ink with an ink jettable viscosity. A radiation curable, polyester urethane oligomer is provided. Preferably, the oligomer has a viscosity to mass index below about 25:1. The oligomer is a reaction product of ingredients comprising a polyisocyanate and a radiation curable polyester alcohol. The alcohol comprises at least one radiation curable moiety, at least one hydroxyl group, and a polyester moiety comprising at least two ester groups. The oligomer is blended with ingredients comprising a sufficient amount of a reactive diluent such that the ink has an ink jettable viscosity.

In another aspect, the present invention relates to a printing method. A radiation curable ink is ink jetted onto a receiving substrate to form at least one printed feature. The radiation curable ink comprises a reactive diluent and a radiation curable, polyester urethane oligomer. The oligomer is a reaction product of ingredients comprising a polyisocyanate and a radiation curable polyester alcohol. Preferably, the oligomer has a viscosity to mass ratio below about 25:1. The printed feature is exposed to a curing amount of radiation.

In another aspect, the present invention relates to a method of making a printing ink with an ink jettable viscosity. A radiation curable, polyester urethane oligomer is provided that is a reaction product of ingredients comprising an aliphatic polyisocyanate and a radiation curable alcohol. The alcohol includes one or more radiation curable moieties, one or more hydroxyl moieties, and one or more polycaprolactone moieties. The oligomer is blended with a sufficient amount of a reactive diluent and other optional ingredients if desired such that the ink has an ink jettable viscosity.

In another aspect, the present invention relates to printing method. A radiation curable ink is ink jetted onto a receiving substrate to form at least one printed feature. The ink comprises a radiation curable, polyester urethane oligomer that is a reaction product of ingredients comprising an aliphatic polyisocyanate and a radiation curable alcohol. The alcohol includes one or more radiation curable moieties, one or more hydroxyl moieties, and one or more polycaprolactone moieties. A sufficient amount of a reactive diluent also is included such that the ink has an ink jettable viscosity. The printed feature is exposed to a curing amount of radiation.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein:

FIG. 1b is a specific embodiment of the reaction scheme of FIG. 1a.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Prior to curing, fluid compositions of the present invention preferably have one or more of several desirable features. Firstly, radiation curable compositions of the present invention tend to have sufficiently low viscosity properties so that the fluid compositions advantageously may be applied to receiving substrates using ink jetting techniques. Preferably, fluid compositions of the present invention have a viscosity of below about 30 centipoise, preferably below about 25 centipoise, and more preferably below about 20 centipoise at the desired ink jetting temperature (typically from ambient temperature up to about 65° C.). However, the optimum viscosity characteristics for a particular composition will depend upon the jetting temperature and the type of ink jet system that will be used to apply the composition onto the substrate. For example, for piezo ink jet applications, a typical desired viscosity is about 3 to about 30 centipoise at the print head temperature. Generally, this means that the fluid compositions preferably have a viscosity at 25° C. of up to about 50 centipoise. Particularly preferred embodiments of the fluid composition described herein tend to have viscosities in this range of 10 to 16 centipoise at moderate temperatures of 25° C. to about 65° C.

Such viscosity characteristics generally help to ensure that the composition will be jettable at the desired print head temperature. Due to potential volatility and reactivity of one or more constituents of radiation curable compositions, the fluid compositions preferably are jetted at temperatures no higher than about 65° C., and more preferably no higher than about 50° C.

As another preferred characteristic that is desirable for ink jetting applications, fluid compositions of the present invention desirably have moderate to low surface tension properties. Preferred formulations have a surface tension in the range of from about 20 dynes/cm to about 50 dynes/cm, more preferably in the range of from about 22 dynes/cm to about 40 dynes/cm at the printhead operating temperature. Most radiation curable, monomeric constituents (hereinafter referred to as the "reactive diluent") to be incorporated into the radiation curable component of the present invention already have surface tension characteristics in the preferred ranges. Therefore, formulating fluid compositions of the present invention with appropriate surface tension characteristics for inkjet applications is easily accomplished.

Preferred fluid compositions of the present invention also have Newtonian or substantially Newtonian viscosity properties. A Newtonian fluid has a viscosity that is at least substantially independent of shear rate. As used herein, the viscosity of a fluid will be deemed to be substantially independent of shear rate, and hence at least substantially Newtonian, if the fluid has a power law index of 0.95 or greater. The power law index of a fluid is given by the expression $$\eta = m\gamma^{n-1}$$

wherein $\eta$ is the shear viscosity, $\gamma$ is the shear rate in $s^{-1}$, m is a constant, and n is the power law index. The principles of the power law index are further described in C. W. Macosko, "Rheology: Principles, Measurements, and Applications", ISBN # 1-56081-579-5, page 85.

Newtonian fluid compositions are especially preferred over non-Newtonian fluids that exhibit substantial shear thinning behavior. Typically, substantially shear thinning fluids are elastic. Elasticity of a fluid tends to cause extension thickening behavior, which is known to prevent jetting of inks even when the low viscosity requirement is satisfied. Another reason for using fluids with at least substantially Newtonian viscosity properties is that jetting is typically achieved at shear rates around $1 \times 10^6$ $s^{-1}$, while ink refill from the reservoir into the ink jet head channels takes place at 100–1000 $s^{-1}$. A highly shear thinning ink will have much higher viscosity at the refill rate than at the jetting rate. This tends to slow refill, compromising printhead performance. Shear thinning fluids can be avoided by formulating fluid compositions that exhibit little or no elasticity. Elasticity is minimized by controlling the amount and weight average molecular weight of oligo/resins incorporated into the fluid composition, by selecting highly branched oligo/resins, and/or by manipulating the solubility of the higher molecular weight species in the formulation. Generally, formulations in which the oligo/resins are more soluble tend to be more elastic.

Compositions of the present invention also preferably have one or more of several desirable features when cured. Firstly, preferred embodiments of the present invention are compatible with an extremely wide variety of porous and nonporous substrates. This is due, at least in part, to the combinations of oligo/resin and monomer(s) of the reactive diluent. The radiation curable fluid compositions also exhibit good adhesion to non-porous substrates, especially those used in retroreflective sheeting top films, when measured according to ASTM D 3359-95A Standard Test Methods for Measuring Adhesion by Tape Test, Method B.

Cured compositions of the present invention may have a wide range of elongation characteristics depending upon the intended use. For example, such compositions may be characterized by an elongation of at least about 1%, preferably at least about 20%, more preferably from more than about 50% to about 300% or more, as desired. Cured compositions with elongation characteristics greater than about 50% are beneficially used to reduce stress cracks, improve toughness, and improve weatherability. In the practice of the present invention, elongation of a cured material refers to the maximum elongation at break determined in accordance with ASTM Test Method D-3759.

Many embodiments of the radiation cured fluids of the present invention, excepting any containing opaque inorganic carbon black or organic black dye, are transparent when measured according to ASTM 810 Standard Test Method for Coefficient of Retroreflection of Retroreflective Sheeting. That is, when coated onto retroreflective substrates, the visible light striking the surface of such films is transmitted through to the retroreflective sheeting components. This property makes such inks particularly useful for outdoor signing applications, in particular traffic control signing systems. The radiation cured films of these liquid formulations are easily formulated and cured under conditions so as to exhibit tack-free surfaces when cured. This makes the printed images resistant to dirt build-up and the like.

In preferred embodiments, the cured films also resist marring when subjected to moderate abrasion. A useful method for evaluating abrasion resistance is ASTM D 4060, Standard Test Method for Abrasion Resistance of Organic Coatings by Taber Abraser. When monitored by percent retention of gloss or retroreflectivity over the abraded surfaces, the cured films of preferred embodiments show excellent abrasion resistance relative to conventional screen printing ink standards.

The radiation cured films of preferred embodiments also exhibit durability in outdoor applications, particularly when used as a system with retroreflective sheeting. Based upon direct comparison, these films exhibit comparable or improved durability relative to conventional screen printing ink standards.

Radiation curable compositions of the present invention incorporate (1) a radiation curable urethane oligomer that is an adduct of ingredients comprising a polyisocyanate component and a radiation curable alcohol, (2) a radiation curable reactive diluent, and (3) one or more optional adjuvants that are selected based upon the intended use of the compositions. Radiation curable, urethane oligomers of the present invention are generally characterized by atypically low viscosity characteristics, have a relatively high urethane content, are very economical to manufacture, show good adhesion to a wide range of substrates, and are compatible with a wide range of substrates. For purposes of adhesion and mechanical properties such as toughness and abrasion resistance, it is desirable to incorporate at least about 10%, preferably about 20% to about 40% of the radiation curable oligomer into an ink jet ink.

The radiation curable, polyester urethane oligomers of the present invention have a much lower viscosity to mass ratio as compared to conventional radiation curable polyester urethane oligomers that are adducts of a polyester polyol component, e.g., hydroxyethyl acrylate, and a polyisocyanate. Preferred embodiments of oligomers of the present invention, for example polyester urethane oligomers, are characterized by viscosity to mass ratios of less than about 25:1, more preferably less than about 10:1. As a consequence, relatively greater amounts of oligomers of the present invention may be readily incorporated into ink jettable compositions for which low viscosity is critical. In contrast, many conventional radiation curable polyester urethane oligomers may tend to have much higher viscosity to mass ratios, e.g., as high as about 50:1 or more. Substantially lesser amounts of such oligomeric materials can be incorporated into ink compositions before the viscosity of the resultant ink would become too high to be used for ink jetting. Other kinds of conventional polyurethane oligomers, such as those containing polyether segments might have low viscosity to mass ratios, but unfortunately fail to show good adhesion to a wide range of substrates. Such materials also tend to lack outdoor durability.

In the practice of the present invention, the viscosity to mass ratio (VMI) of a material is given by the expression $$VMI = \eta_B / M_n$$

wherein $\eta_B$ is the Brookfield viscosity in centipoise of the material at a temperature of 25° C., and $M_n$ is the number average molecular weight of the material in grams per mole. Oligomers of the present invention may have number average molecular weights and Brookfield viscosities within a wide range, depending upon the intended use. For ink jetting applications, oligomers are formulated such that the number average molecular weight and viscosity are generally relatively low. Preferred ink jettable compositions of the present invention have number average molecular weights in the range of from about 500 to about 10,000, preferably about 900 to about 2500, and have a Brookfield viscosity (centipoise) of preferably up to about 50,000, more preferably from about 1000 to 40,000, and most preferably from about 1,000 to 15,000.

Incorporating a urethane oligomer into a composition such as an ink is very desirable, because urethane oligomers, particularly polyester urethane oligomers, provide such compositions with flexibility, toughness, resiliency, durability, low shrinkage, weatherability, good mechanical properties, better adhesion, and/or the like. However, the viscosity of such a composition tends to increase with increasing urethane content of the oligomer. A particular advantage of oligomers of the present invention is that these oligomers may incorporate a relatively high level of urethane content without as dramatic an increase in viscosity as might be expected. This allows the oligomers to be incorporated into formulations to obtain urethane-type properties in applications, such as ink jet printing, for which maintaining low viscosity is critical.

The weight percent of urethane nitrogen is a direct measure of the amount of urethane content in a material. Higher weight percents of urethane nitrogen indicate a proportionally higher level of urethane content, and lower weight percents of urethane nitrogen indicate a proportionally lower level of urethane content. For ink jetting applications in which low viscosity is critical, preferred oligomers incorporate 0.5 to 5, preferably 2 to 4 weight percent urethane nitrogen. For other printing applications, e.g., screen printing or the like, in which viscosity is much less critical, the weight percent of urethane nitrogen may vary over a much broader range, e.g., 0.5 to about 10 weight percent urethane nitrogen.

In practical effect, the oligomer adducts of the present invention may be viewed as the reaction product resulting from end-capping a particular class of polyisocyanate materials either directly or indirectly with one or more radiation curable polyester alcohols. An alternative, conventional approach for forming radiation curable oligomers involves end capping a polyol component, e.g., a diol, with a radiation curable isocyanate, e.g., isocyanatoethyl methacrylate (commonly known as IEM). This alternative, conventional approach also can provide urethane oligomers having low viscosity to mass ratios below about 25:1. However, as compared to oligomers of the present invention, IEM capped polyols are much more expensive to manufacture, and tend to have lower urethane content for comparable viscosity performance.

Preferred polyisocyanates are liquids at room temperature and are readily soluble in the reactive diluent. When incorporated into a urethane oligomer, the resultant urethane oligomer tends to have surprisingly lower viscosity characteristics than would be conventionally expected.

The polyisocyanate component preferably comprises one or more polyfunctional isocyanates that respectively comprise two or more NCO groups and that preferably are aliphatic. A preferred class of polyfunctional isocyanates may be represented by the formula wherein W is an m-valent moiety. Preferably, W is aliphatic. W may be straight, branched, or cyclic and has a backbone comprising 3 to 100 carbon atoms. W optionally may comprise N, S, and/or O hetero atoms. Additionally, m is 2 or more, preferably 2 to 5, more preferably 2 to 3.

In one preferred embodiment, m is 2 and W is a divalent moiety having a backbone of 5 to 10 carbon and/or hetero atoms and containing one or more substituents other than H to provide W with a branched structure. Representative substituents include lower alkyl groups of 1 to 4 carbon atoms, lower alkoxy groups of 1 to 4 carbon atoms, non-aromatic cyclic moieties, combinations of these and the like. Of these, nonpolar moieties such as lower alkyl groups of 1 to 4 carbon atoms are preferred substituents. One or more of —$CH_3$ and/or —$CH_2CH_3$ are preferred substituents.

Representative, preferred polyisocyanates includes the following diisocyanates:

which is 2, 2, 4-trimethylhexamethylene diisocyanate; and which is 2,4,4-trimethylhexamethylene diisocyanate. These two diisocyanates are commercially available as a mixture that is commonly referred to as "TMDI". Another example of a suitable diisocyanate is isophorone diisocyanate, commonly referred to as "IPDI" and sold for example under the tradename "Desmodur I" by Bayer Corporation. Another example of a suitable diisocyanate is 4,4'-methylenebis (cyclohexyl isocyanate) commonly referred to as "$H_{12}MDI$" and sold for example under the tradename "Desmodur W" by Bayer Corporation.

In an alternate embodiment, m is 3 and W comprises an isocyanurate moiety coupled to at least three NCO moieties by appropriate linking groups such as alkylene groups of 2 to 20 carbon atoms, ether containing moieties of 2 to 20 carbon atoms, ester containing moieties of 2 to 20 carbon atoms, urethane containing moieties of 2 to 20 carbon atoms, combinations of these, and the like. One class of preferred polyisocyanates incorporating an isocyanurate ring have the formula (Such compounds may be referred to hereinafter as the isocyanurate triisocyanate, or "ITI".):

wherein each R is independently an n+1 valent moiety that may be straight, branched or cyclic. Each R independently is preferably divalent, preferably aliphatic, and preferably comprising 2 to 20 carbon atoms. Each R preferably is —CH$_2$ CH$_2$ CH$_2$ CH$_2$ CH$_2$ CH$_2$—, because such triisocyanate functional isocyanurate compounds are commercially available and liquids at room temperature. Some commercially available materials of this type such as "Tolonate HDT" from Rhodia Corporation and "Desmodur N-3300" from Bayer Corporation contain significant amounts of oligomeric species, that is, where one or more of the NCO groups in the above structure forms part of the nucleus of another isocyanurate ring. It is preferred, but not required, for purposes of this invention, that the quantity of these oligomeric species be minimized, since they add to viscosity. Commercially available grades which have relatively low amounts of these oligomers and low viscosity include "Tolonate HDT-LV" from Rhodia Corporation and "Desmodur N-3600" from Bayer Corporation.

In other embodiments the polyisocyanate comprises a biuret of an aliphatic diisocyanate such as hexamethylene diisocyanate biuret sold for example under the tradenames "Tolonate HDB" and "Tolonate "HDB-LV" from Rhodia Corporation, or "Desmodur N-100" and "Desmodur N-3300" from Bayer Corporation. Other polyisocyanates useful in the current invention include aliphatic diisocyanates containing uretdione (dimer) groups, mixtures of dimer and trimer groups (for example, "Desmodur N-3400 from Bayer Corp.), and allophanate groups. Another useful polyisocyanate is "Desmodur TPLS 2294" and the like which comprises an asymmetric trimer group having the following structure:

In other embodiments, the polyisocyanate optionally may comprise mixtures of two or more isocyanate functional compounds. For example, one such mixture may comprise at least two of TMDI, ITI, and/or IPDI. In one such embodiment, the mixture may comprise, on a relative basis, 1 to 19 parts by weight TMDI and 1 to 19 parts by weight of IPDI. In another such embodiment, the mixture may comprise, on a relative basis 1 to 19 parts by weight TMDI and 1 to 19 parts by weight of ITI. In another such embodiment, the mixture may comprise, on a relative basis, 1 to 19 parts by weight IPDI and 1 to 19 parts by weight of ITI. In another such embodiment, the mixture may comprise, on a relative basis, 1 to 19 parts by weight TMDI, 1 to 19 parts by weight of IPDI and 1 to 19 parts by weight of ITI.

The radiation curable alcohol component of the oligomer adduct may be any one or more compounds respectively comprising one or more OH groups, one or more polycaprolactone ester moieties, and one or more radiation curable moieties. In the practice of the present invention, "radiation curable" refers to functionality directly or indirectly pendant from a monomer, oligomer, or polymer backbone (as the case may be) that participate in crosslinking reactions upon exposure to a suitable source of curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. The term "(meth)acryl", as used herein, encompasses acryl and/or methacryl.

The energy source used for achieving crosslinking of the radiation curable functionality may be actinic (e.g., radiation having a wavelength in the ultraviolet or visible region of the spectrum), accelerated particles (e.g., electron beam radiation), thermal (e.g., heat or infrared radiation), or the like. Preferably, the energy is actinic radiation or accelerated particles, because such energy provides excellent control over the initiation and rate of crosslinking. Additionally, actinic radiation and accelerated particles can be used for curing at relatively low temperatures. This avoids degrading components that might be sensitive to the relatively high temperatures that might be required to initiate crosslinking of the radiation curable groups when using thermal curing techniques. Suitable sources of actinic radiation include mercury lamps, xenon lamps, lasers, electron beam, carbon arc lamps, tungsten filament lamps, sunlight, and the like. Ultraviolet radiation, especially from medium pressure mercury lamps, is most preferred.

Radiation curable alcohols comprising a single OH group, one or more radiation curable moieties and one or more ester moieties are preferred inasmuch as such materials promote good adhesion and lower viscosity. Representative examples of radiation curable, polyester alcohols suitable in the practice of the present invention include the hydroxy functional polycaprolactone ester (meth)acrylates having the formula wherein n has a range from about 1–25, preferably from about 2 to 5 such that the radiation curable alcohol is soluble in a reactive diluent; and R is a monovalent substituent, preferably hydrogen or a lower alkyl or cycloalkyl group of 1 to 4 carbon atoms, more preferably hydrogen or a methyl group. The radiation curable alcohol has a number average molecular weight in the range of 200 to 3000. Materials having this structure will be hereafter referred to as "polycaprolactone (meth)acrylates" even if n=1. An embodiment of an alcohol functional polycaprolactone (meth)acrylate for which n is about 2 is commercially available under the trade designation "TONE M-100" from Union Carbide Corp.

A particularly preferred radiation curable polyester urethane oligomer is a reaction product resulting from reacting at least substantially a stoichiometric amount of TMDI and radiation curable, caprolactone containing, alcohol functional (meth)acrylate such as the M-100 compound identified above.

The amount of the radiation curable alcohol to be incorporated into the oligomer may vary within a wide range, depending upon factors such as whether the oligomer will incorporate a polyol component, the desired end use of the oligomer, the desired number average molecular weight of the oligomer, and the like. In embodiments in which no polyol component will be used, the radiation curable alcohol preferably is generally present in at least a stoichiometric amount relative to the polyisocyanate component so that substantially no unreacted NCO moieties remain in the oligomer after the two ingredients are reacted with each other. Generally, to make sure that all NCO groups react, a slight excess of OH moieties, e.g., 1% to 5%, relative to NCO moieties is desired. If a polyol component will be used, the polyisocyanate component is preferably present in a stoichiometric excess relative to the radiation curable alcohol to ensure that at least some NCO moieties are available for reaction with the polyol component.

Optionally, the oligomer may further incorporate a polyol component comprising one or more mono-ols, diols, triols, tetrols, higher functional alcohols, combinations of these, and/or the like. These polyol materials may be monomers, oligomers, and/or polymers. Polyol oligomers are defined herein as comprising between 2 and 20 monomers and having a number average molecular weight of between 400 and 10,000. Polyol polymers are defined as comprising 21 or more monomers. The use of triol and/or tetrol monomers is preferred in that these materials provide the oligomer with a branched structure. Branching is desirable, because branched oligomers tend to be more soluble and have less of a tendency to crystallize when blended with the reactive diluent. Branched oligomers also tend to have a lower viscosity than straight-chained embodiments of comparable molecular weight. Branched oligomers furthermore allow for more radiation curable terminal groups per molecule which can give improved cure rates.

A particularly preferred embodiment of the polyol component comprises a polycaprolactone diol, triol, and/or tetrol. Most preferably, the polyol component comprises a polycaprolactone triol. Polycaprolactone materials advantageously are compatible with the reactive diluent, are compatible with hydroxy functional polycaprolactone (meth) acrylates, and tend to be characterized by favorable, narrow molecular weight distributions. A particularly preferred polycaprolactone triol has a weight average molecular weight of about 550 and is commercially available under the trade designation "TONE 0305" from Union Carbide Corp.

The amount of optional polyol component incorporated into the oligomer may vary within a wide range. Generally, using greater amounts of polyol component tends to provide oligomers with greater adhesion and solubility in the reactive diluent, yet tends to lead to oligomers with higher viscosity. For ink jetting applications for which desirable branching and viscosity characteristics are generally balanced for optimum performance, up to about 50%, more preferably up to about 40%, more preferably up to about 30% of OH groups incorporated into the oligomer may come from one or more polyols.

Radiation curable, urethane oligomers of the present invention may be prepared in a variety of ways. According to one approach, the oligomer can be prepared in a single step reaction in which the polyisocyanate component, the radiation curable alcohol component, and the optional polyol component (if any) are combined and allowed to react in the presence of a suitable catalyst under conditions effective to form an oligomer composition. Alternatively, the oligomer can be prepared in a multistep reaction in which the polyisocyanate is first reacted with one of the radiation curable alcohol or the polyol component in a first step and then with the other in a second step.

A one-step preparation reaction is preferred when the oligomer is prepared without a polyol component. This approach 10 is shown schematically in FIG. 1a in which, on a stoichiometric basis, one mole of diisocyanate 12 is reacted with two moles (or preferably slightly more than about 2 moles) of a radiation curable polyester alcohol 14 having one OH group, two polycaprolactone ester moieties 16 and one radiation curable moiety 18. The oligomer 16 is a linear molecule with two urethane linkages 20 and one radiation curable radiation moiety 18 at each end. The reaction preferably is carried out such that there is sufficient OH on the alcohol 14 to ensure that all of the NCO groups 15 on diisocyanate 12 are reacted when the oligomer 16 is formed. Accordingly, alcohol 14 is present in a slight stoichiometric excess relative to diisocyanate 12. However, it is generally desirable not too have too much excess unreacted polyol present in the reaction product compositions. Accordingly, it is generally preferred if there is about a 1% to 5% excess of OH groups relative to NCO groups when carrying out the reaction.

Figure 1A:
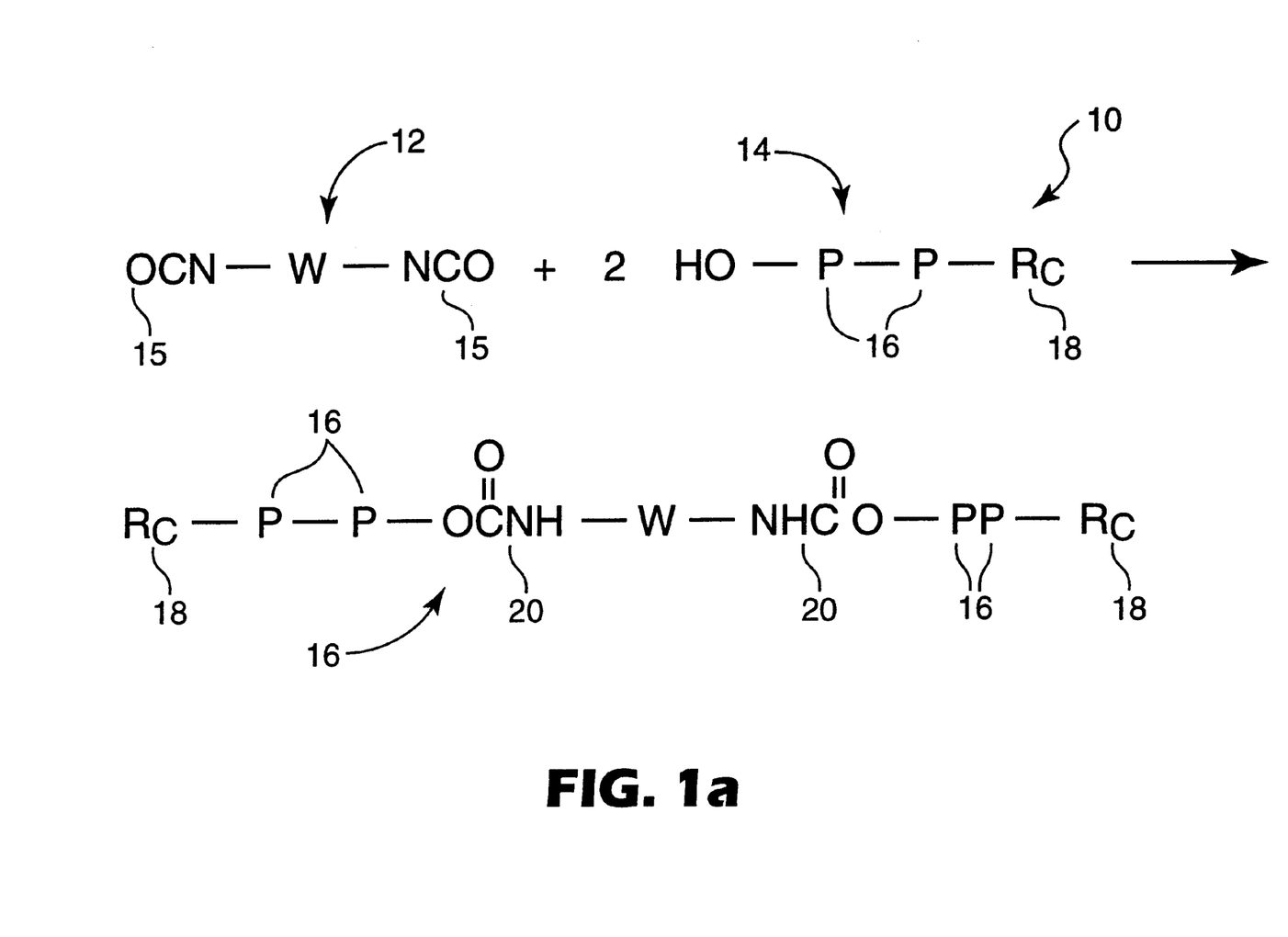
FIG. 1a is a schematic illustration of a one step reaction scheme for making an oligomer composition of the present invention.

Urethane forming reactions of the present invention such as that depicted in FIG. 1a generally may be carried out in the absence of solvent at a suitable temperature in the presence of a catalyst that facilitates reaction between OH and NCO groups. Suitable reaction temperatures are in the range from about 50° C. up to about 100° C. A reaction temperature in the range of about 50° C. to about 80° C. is preferred. Representative catalysts include dibutyltin dilaurate, other organotin, organobismuth and organozirconium compounds, combinations of these, and the like. Reaction mixtures of the present invention generally include a catalytic amount of such materials, preferably 50 parts per million to about 0.1 weight percent of the reactants. The reaction is deemed to be complete when IR analysis of a reaction mixture sample cannot detect any unreacted isocyanate.

Figure 1B:
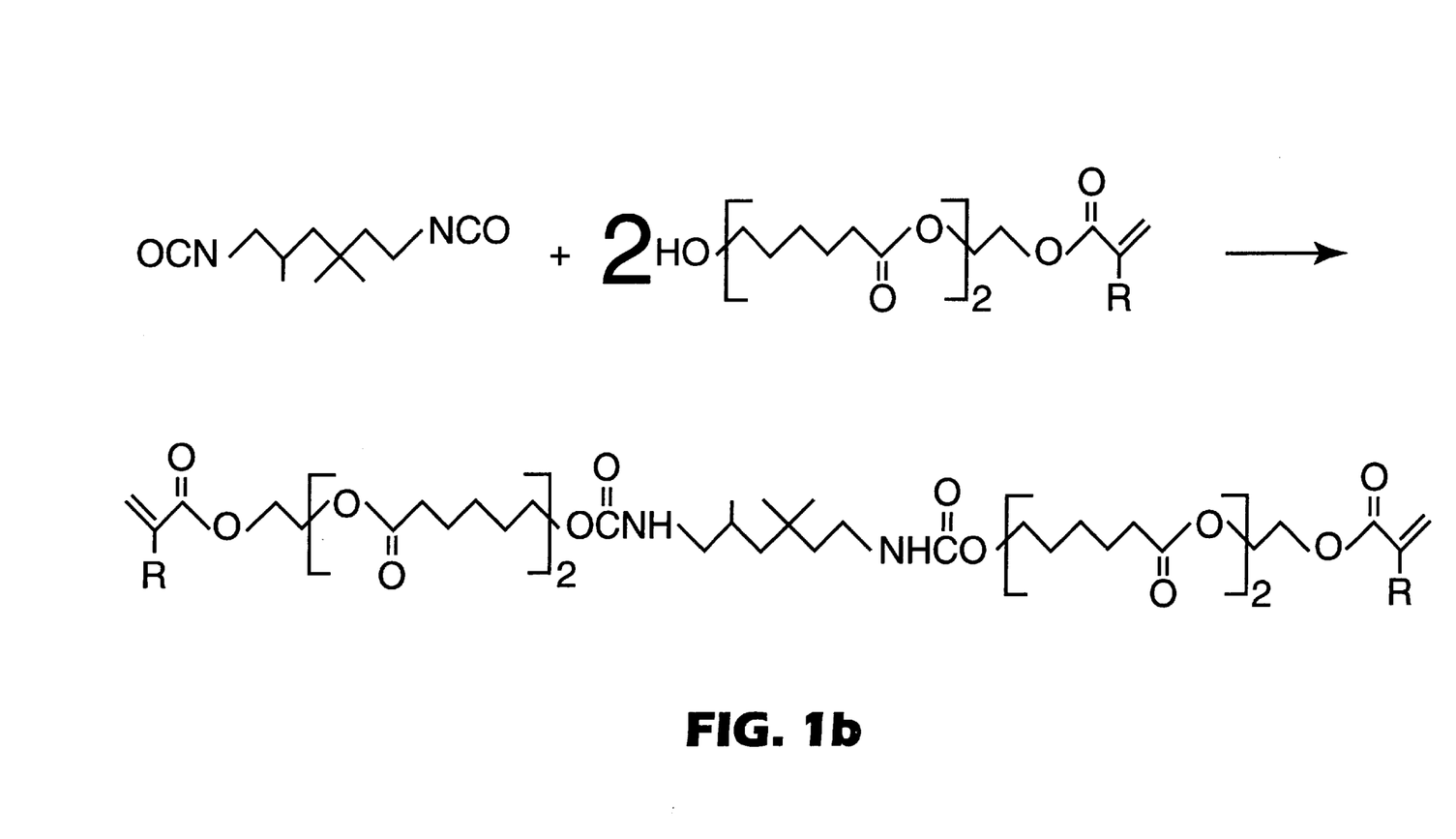

FIG. 1b shows how the reaction scheme of FIG. 1a is carried out when the diisocyanate is TMDI and the radiation curable alcohol is an alcohol functional polycaprolactone acrylate for which n is about 2. The reaction product shown in FIG. 1b is a linear, radiation curable oligomer having a weight average molecular weight of about 900.

Figure 2:
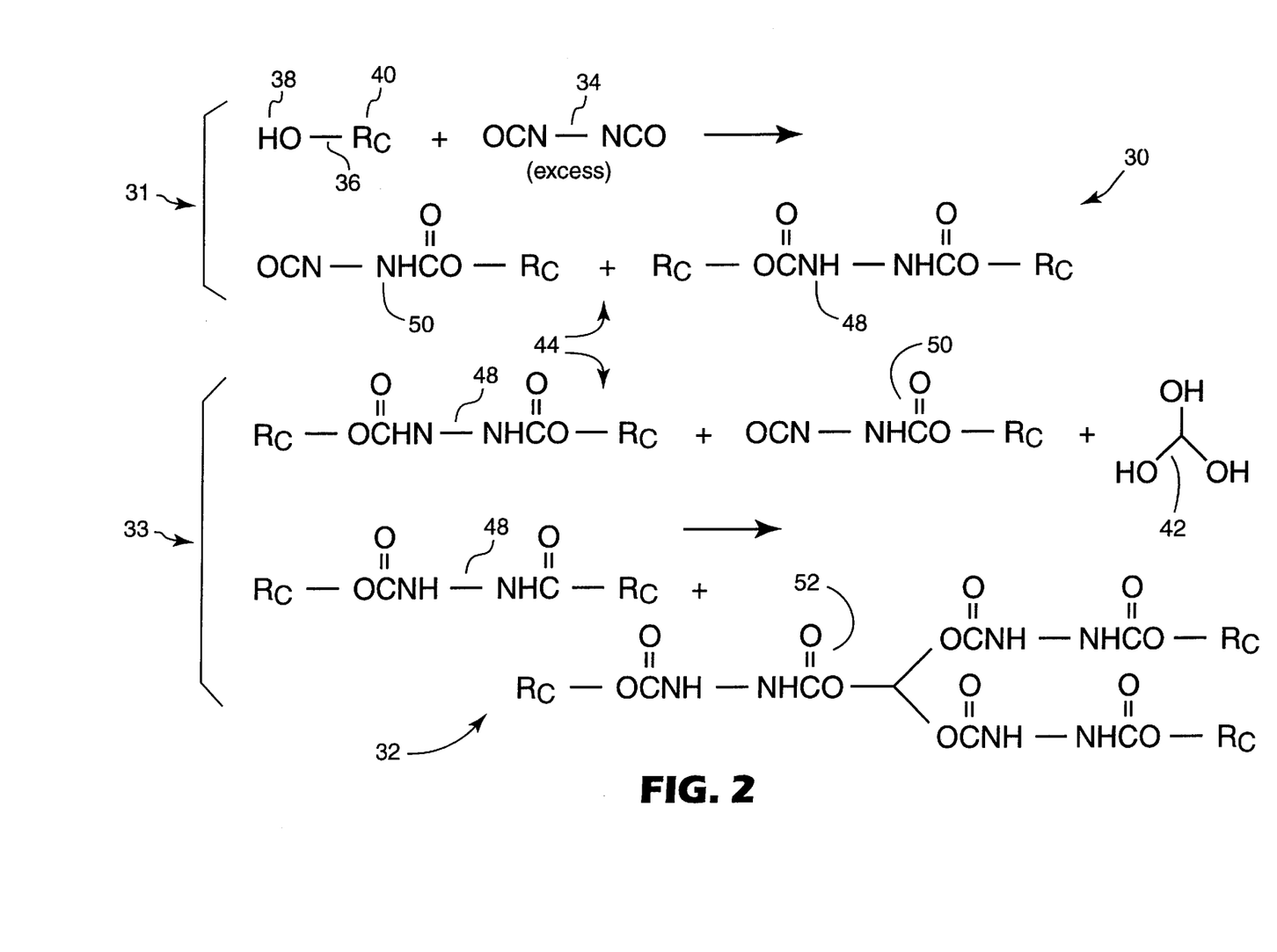
FIG. 2 is a schematic illustration of a two step reaction scheme for making an oligomer of the present invention.

It is also an option to use a multistep reaction to prepare the oligomer when the oligomer incorporates a polyisocyanate component, a radiation curable alcohol component, and a polyol component. For illustration purposes, a preferred multistep reaction scheme 30 is shown in FIG. 2 wherein an oligomer composition 32 is formed in two steps from a diisocyanate 34, a radiation curable alcohol 36 having a single OH group 38 and a single radiation curable group 40, and a triol 42. In a first step 31, the radiation curable alcohol 36 is reacted with a stoichiometric excess of the diisocyanate 34 to form an intermediate reaction product 44 that tends to comprise a mixture of radiation curable, urethane oligomer 48 and radiation curable, NCO-functional urethane oligomer 50. Generally, the relative molar amounts of diisocyanate 34 and radiation curable alcohol 36 may vary within a wide range. As general guidelines, using a molar ratio of diisocyanate 34 to radiation curable alcohol 36 in the range of 0.6:1 to 1:1, preferably 0.6:1 to 0.8:1 would be suitable for preparing an oligomer composition suitable for ink jetting applications.

Still referring to FIG. 2, in second reaction step 33, the intermediate reaction product 44 is reacted with a stoichiometric amount of the triol 42 to form oligomer composition 32 comprising urethane oligomer 48 (which tends not to undergo any reaction in the second step and remains in the reaction mixture from the first step) and chain extended, radiation curable, urethane oligomer 52. The reaction preferably is carried out such that there is sufficient OH on the triol 42 to ensure that all of the NCO groups on radiation curable, NCO-functional urethane oligomer 50 are reacted when chain extended, radiation curable, urethane oligomer 52 is formed. Accordingly, triol 42 is present in an amount such that OH groups of, triol 42 are present at a slight stoichiometric excess relative to reactive NCO groups that are present. However, it is generally desirable not to have too much excess unreacted triol 42 present in the reaction product compositions. Accordingly, it is generally preferred if there is about a 1 to 10% excess of OH groups relative to NCO groups when carrying out the second reaction step 33.

FIG. 2 represents an idealized view of the multistep reaction scheme. In actual practice, some side reactions may occur that result generally in higher oligomeric reaction products. For example, some unreacted diisocyanate may be present as a product of the first reaction step. This unreacted material will be present in the second step to react with available hydroxyl functionality, either on the triol and/or other species containing hyrdoxyl functionality such as hydroxyl functional, intermediate reaction species.

The reactive diluent preferably comprises one or more radiation curable monomers, oligomers, and/or polymers. Subject to desired performance standards, any radiation curable monomer, oligomer, and/or polymer, or combinations thereof, may be incorporated into the reactive diluent. Accordingly, the present invention is not intended to be limited to specific kinds of radiation curable monomers, oligomers, and polymers so long as these processing conditions are satisfied. However, for ink jetting applications, such monomers, oligomers, and/or polymers, at least in combination, preferably exist as a liquid of ink jettable viscosity at the desired ink jet head temperature. The term "monomer" as used herein refers to a single, one unit molecule capable of combination with itself or other monomers to form oligomers or polymers. The term "oligomer" refers to a compound that is a combination of 2 to 20 monomer units. The term "polymer" refers to a compound that is a combination of 21 or more monomer units. As used herein, the term "oligo/resin" shall be used to refer collectively to oligomers and polymers. Preferred oligo/resins have a number average molecular weight below about 100,000, preferably from about 500 to about 30,000, and more preferably from about 700 to about 10,000.

Aromatic materials generally tend to have poor weatherability and/or poor resistance to sunlight. Accordingly, for outdoor applications, aromatic materials are preferably limited and more preferably excluded from the reactive diluents of the present invention.

The monomers, oligomers, and/or polymers of the reactive diluent may comprise mono-, di-, tri- and/or tetra-functionality (in terms of radiation curable moieties). One or more monomers are preferred, especially for ink jetting applications. These monomers function as diluents or solvents for the oligomer and other components (if any), as viscosity reducers, as binders when it is cured, and as crosslinking agents. The amount of such monomers to be incorporated into the reactive diluent can vary within a wide range depending upon the intended use of the resultant composition. As general guidelines, the reactive diluent may comprise from about 25 to about 100, preferably 45 to 100, more preferably about 70 to 100 weight percent of such monomers.

Representative examples of monofunctional, radiation curable monomers suitable for use in the reactive diluent include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth)acrylate, ethyl diglycol (meth)acrylate, isobornyl (meth)acrylate, 2-(2-ethoxyethoxy)ethyl (meth)acrylate, 2-ethylhexyl (meth)acrylate, lauryl (meth)acrylate, butanediol mono(meth)acrylate, β-carboxyethyl (meth)acrylate, isobutyl (meth)acrylate, cycloaliphatic epoxide, α-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional polycaprolactone ester (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Multifunctional radiation curable materials may also be incorporated into the reactive diluent to enhance one or more properties of the reactive diluent, including crosslink density, hardness, curing rate, or the like. If present, the reactive diluent may comprise up to about 1 to about 20 weight percent of such materials. Examples of such higher functional, radiation curable monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentylglycol di(meth)acrylate, combinations of these, and the like.

Representative examples of preferred reactive diluent embodiments found to be suitable in the practice of the present invention include the reactive diluent embodiments described in Assignee's U.S. patent application Ser. No. 09/711,345, filed Nov. 9, 2000, titled INKS AND OTHER COMPOSITIONS INCORPORATING LIMITED QUANTITIES OF SOLVENT ADVANTAGEOUSLY USED IN INK JETTING APPLICATIONS in the names of Ylitalo et al.; and also in Assignee's U.S. patent application Ser. No. 09/711,336, filed Nov. 9, 2000, titled WEATHER RESISTANT, INK JETTABLE, RADIATION CURABLE, FLUID COMPOSITIONS PARTICULARLY SUITABLE FOR OUTDOOR APPLICATIONS in the names of Lee et al.

The relative amounts of reactive diluent and radiation curable, urethane oligomer may vary within a wide range depending upon the intended use of the resultant composition. For example, ink jettable compositions of the present invention preferably include an amount of reactive diluent effective to provide the composition with an ink jettable viscosity. For piezo ink jet applications, a typical desired viscosity is about 10 to about 30 centipoise at 25° C. Such viscosity characteristics generally ensures that the composition will be jettable at the desired print head temperature, which is commonly in the range of from about 20° C. to about 60° C. As practical guidelines, compositions may contain about 0.1 to about 50, preferably 5 to 20, weight percent of the oligomer.

In addition to the oligomer and the reactive diluent, one or more other additives may be incorporated into compositions of the present invention in accordance with conventional practices. Typically about 0.5 to about 15% preferably 0.5 to about 10% of an inorganic or organic pigment may be dispersed into the ink. Other optional additives include one or more solvents, photoinitiators, colorants, slip modifiers, thixotropic agents, foaming agents, antifoaming agents, flow or other rheology control agents, waxes, oils, plasticizers, binders, antioxidants, photoinitiator stabilizers, fungicides, bactericides, organic and/or inorganic filler particles, leveling agents, opacifiers, antistatic agents, dispersants, and the like.

The compositions of the present invention are made by mixing together the desired ingredients using any suitable technique. For example, in a one step approach, all of the ingredients are combined and blended, stirred, milled, or otherwise mixed to form a homogeneous composition. As another alternative, the oligomer and reactive diluent may be blended together in a first step. Then, in one or more additional steps, one or more additives may be incorporated into the composition via blending, milling, or other mixing technique.

The compositions of the present invention may be applied in any suitable fashion onto a receiving substrate such as retroreflective substrates, metal, paper, woven or nonwoven fabrics, resin-coated paper, foil, polymer articles, polymer films, and the like. Representative examples of coating techniques include screen printing, spraying, ink jetting, gravure coating, knife coating, roll coating, brushing, curtain coating, flexographic printing, offset printing, and the like. The compositions of the present invention may be used to form graphic elements, text items, continuous layers, bar codes, three-dimensional structures, or other features.

Compositions of the present invention are highly compatible with both porous and nonporous substrates. The compatibility with nonporous materials allows these compositions to be applied onto a wide range of nonporous polymer films, including polybutylene terephthalate, polyethylene terephthalate, other polyester, polyolefin, polymethyl (meth)acrylate, vinyl acetate, ABS, polyvinyl, polystyrene, high impact polystyrene, polycarbonate, polyurethane, epoxy, polyimide, polyamide, polyamideimide, polyacrylate, polyacrylamide, combinations of these, and the like. Because radiation curing generates little heat, the compositions of the present invention may be used on heat sensitive substrates.

After being coated, the compositions may be cured using a suitable fluence and type of curing energy. The amount of curing energy to be used for curing depends upon a number of factors, such as the amount and the type of reactants involved, the energy source, web speed, the distance from the energy source, and the thickness of the material to be cured. Generally, the rate of curing tends to increase with increased energy intensity. The rate of curing also may tend to increase with increasing amounts of photocatalyst and/or photoinitiator being present in the composition. As general guidelines, actinic radiation typically involves a total energy exposure from about 0.1 to about 10 J/cm$^2$, and electron beam radiation typically involves a total energy exposure in the range from less than 1 megarad to 100 megarads or more, preferably 1 to 10 Mrads. Exposure times may be from less than about 1 second up to 10 minutes or more. Radiation exposure may occur in air or in an inert atmosphere such as nitrogen.

Because the oligomer of the present invention has such low viscosity characteristics, compositions of the present invention that incorporate these oligomers may be easily formulated to have low viscosities suitable for ink jetting without the need for any solvent. Accordingly, these compositions may be loaded into the selected ink jet system at 100% solids (i.e., neat), jetted onto the desired substrate in the desired pattern, and then radiation cured.

The present invention will now be further described with reference to the following illustrative examples. The following abbreviations are used throughout the examples:

| | |
|---|---|
| THFFA | tetrahydrofurfuryl acrylate; |
| IBOA | isobornyl acrylate; |
| EEEA | 2-(2-ethoxyethoxy)ethyl acrylate; |
| HDDA | hexanediol diacrylate; |
| NVC | N-vinylcaprolactam; |
| IPTX | isopropylthioxanthone commercially available under the trade designation SPEEDCURE ITX from Aceto Corp. of New Hyde Park, NY; |

The following additional materials were used in the examples:

TINUVIN 292 is a trade designation for a stabilizer available from Ciba Specialty Chemicals of Tarrytown, N.Y.

IRGACURE 819 is a trade designation for bis(2,4,6-trimethylbenzoyl)phenylphosphine oxide, IRGACURE 651 is a trade designation for 2,2-dimethoxy-1,2-diphenylethan-1-one, and IRGACURE 369 is a trade designation for 2-benzyl-2-dimethylamino-1-(4-morpholinophenyl)butan-1-one, all available from Ciba Specialty Chemicals of Tarrytown, N.Y.

SOLSPERSE 32000 is a trade designation for a dispersant available from Avecia Inc. of Wilmington, Del.

EBECRYL 8800 is a trade designation for an aliphatic urethane acrylate diluted 10% with ethoxyethoxyethyl acrylate available from UCB Chemicals of Smyrna, Ga.

Pigment Red 179 and Pigment Red 224 trade designations for red pigments available from Bayer Corp. of Pittsburgh, Pa.

Tetrahydrofurfuryl acrylate (THFFA), isobornyl acrylate (IBOA), 2-(2-ethoxyethoxy)ethyl acrylate (EEEA), hexanediol diacrylate (HDDA), isooctyl acrylate (IOA) and N-vinylcaprolactam (NVC) are available from Sartomer Co. of Exton, Pa.

3M Diamond Grade sheeting refers to DIAMOND GRADE LDP REFLECTIVE SHEETING SERIES 3970 retroreflective film (polymethyl methacrylate) available from 3M Company.

3M High Intensity Sheeting refers to 3M SCOTCHLITE HIGH INTENSITY SHEETING SERIES 3870 retroreflective film (polymethyl methacrylate) available from 3M Company.

EXAMPLE 1

Reaction product of TMDI with PolycaprolactoneAcrylate

To 281.3 g polycaprolactone acrylate ("Tone M-100", Union Carbide Corp., 0.818 equivalents) was added 40 mg 2,6-di-tert-butyl-4-methyl phenol (BHT) and 1 drop dibutyltin dilaurate (Aldrich Chemical Co.). This was heated under an atmosphere of dry air to 90° C. and 84.2 g "Vestanat" TMDI (a mixture of 2,2,4-trimethyl hexamethylene diisocyanate and 2,4,4-trimethylhexamethylene diisocyanate, 0.8 eq., Creanova Inc.) was added slowly, controlling the exotherm to under 100° C. with a water bath. The reaction was held at 90° C. for 8 hours, whereupon the IR spectrum showed no residual isocyanate. The Brookfield viscosity of the product was determined to be 2500 cps. The calculated molecular weight of this material is 875.

EXAMPLE 2

Reaction Product of TMDI with 89% Polycaprolactone Acrylate, 11% Other Polyols

To 60 g polycaprolactone acrylate (molecular weight 344, 0.174 eq., Aldrich Chemical Co.) was added 200 mg BHT and 1 drop dibutyltin dilaurate. This was heated under an atmosphere of dry air to 45° C. and 24.78 g "Vestanat" TMDI (0.236 eq.) was added slowly, controlling the exotherm to under 55° C. After a 2 hour hold at 50° C., 11.1 g "Tone" 0305 polycaprolactone triol (550 molecular weight, 0.062 eq., Union Carbide Corp) was added along with 2 drops dibutyltin dilaurate. The reaction was held at 50° C. for 48 hours, adding 2 drops of dibutyltin dilaurate at the 24 hour mark. After this the IR spectrum showed a small amount of residual isocyanate which was consumed by adding 1 g ethanol and holding for 2 hours. The Brookfield viscosity of the product was determined to be 9000 cps. Calculated molecular weight data: Mn=1250, Mw=2100. GPC molecular weight data: Mn=1380, Mw=2480.

EXAMPLE 3

Reaction Product of TMDI with 82% Polycaprolactone Acrylate, 18% Other Polyols

To 52 g M-100 polycaprolactone acrylate 0.152 eq.) and 17.6 g Tone 0305 polycaprolactone triol (0.098 eq.) was added 50 mg BHT and 1 drop dibutyltin dilaurate. This was heated under an atmosphere of dry air to 50° C. and 26.15 g "Vestanat" TMDI (0.249 eq.) was added slowly, controlling the exotherm to under 65° C. After a 48 hour hold at 50° C., the infrared spectrum showed a small amount of residual isocyanate which was consumed by adding 1 g ethanol and holding for 2 hours. The Brookfield viscosity of the product was determined to be 19,500 cps.. Calculated molecular weight data: Mn=1600, Mw=5000. GPC molecular weight data: Mn=1430, Mw=4090.

EXAMPLE 4

Reation Product of TMDI with 79% Polycaprolactone Acrylate, 21%° Other Polyols

To 48.6 g "Tone M-100" polycaprolactone acrylate 0.141 eq.) and 20.5 g Tone 0305 polycaprolactone triol (0.114 eq.) was added 50 mg BHT and 1 drop dibutyltin dilaurate. This was heated under an atmosphere of dry air to 50° C. and 26.78 g "Vestanat" TMDI (0.255 eq.) was added slowly, controlling the exotherm to under 65° C. After a 48 hour hold at 50° C., the infrared spectrum showed a small amount of residual isocyanate which was consumed by adding 1 g ethanol and holding for 2 hours. The Brookfield viscosity of the product was determined to be 40,000 cps. Calculated molecular weight data: Mn=1850, Mw=10000. GPC molecular weight data: Mn 1440, Mw=5670.

EXAMPLE 5

Reaction Product of IPDI and 90%Polycaprolactone Acrylate, 10% Other Polyols

To 464.2 g "Tone M-100" polycaprolactone acrylate (1.349 eq.) and 84.2 g Tone 0305 polycaprolactone triol (0.468 eq.) was added 100 mg BHT and 3 drops dibutyltin dilaurate. This was heated under an atmosphere of dry air to 50° C. and 201.7 g "Vestanat" TMDI (1.815 eq.) was added slowly, controlling the exotherm to under 65° C. After a 60 hour hold at 50° C., the infrared spectrum showed a small amount of residual isocyanate which was consumed by adding 0.5 g ethanol and holding for 3 hours. The Brookfield viscosity of the product was determined to be 47,000 cps. Calculated molecular weight data: Mn=1255, Mw=2100. GPC molecular weight data: Mn=1260, Mw=2440.

EXAMPLE 6

Reaction Product of 50/50 IPDI/TMDI with 89% Polycaprolactone Acrylate, 11% Other Polyols To 464.2 g "Tone M-100" polycaprolactone acrylate (1.349 eq.) and 84.2 g Tone 0305 polycaprolactone triol (0.468 eq.) was added 100 mg BHT and 3 drops dibutyltin dilaurate. This was heated under an atmosphere of dry air to 50° C. and 201.7 g "Vestanat" TMDI (1.815 eq.) was added slowly, controlling the exotherm to under 65° C. After a 60 hour hold at 50° C., the infrared spectrum showed a small amount of residual isocyanate which was consumed by adding 0.5 g ethanol and holding for 3 hours. The Brookfield viscosity of the product was determined to be 11,500 cps. Calculated molecular weight data: Mn=1255, Mw=2100. GPC molecular weight data: Mn=1260, Mw=2440.

EXAMPLE 7

Reaction Product of Desmodur N-3300 and Polycaprolactone Acrylate

To 106.8 g (0.56 equivalents) of "Desmodur N-3300" hexamethylene diisocyanate trimer from Bayer Corporation was added 0.2 g dibutyltin dilaurate followed by 0.1 g BHT and 193.2 g (0.56 equivalents) of Sartomer SR-495 polycaprolactone acrylate. Temperature was controlled to below 65° C. with an ice bath under an atmosphere of dry air. The reaction was held at 50° C. for 7 hours and found to be complete by the infrared spectrum of the product. Its molecular weight was calculated as 1614.

EXAMPLE 8

Reaction Product of Rhodia "HDT-LV" and Polycaprolactone Acrylate

To 260.4 g (1.42 equivalents) of "HDT-LV" hexamethylene diisocyanate trimer from Rhodia Corporation was added 0.2 g dibutyltin dilaurate and 0.1 g BHT followed by 490 g (1.42 equivalents) of Tone M-100 polycaprolactone acrylate. Temperature was controlled under an atmosphere of dry air to below 85° C. with an ice bath. The reaction was held at 70° C. for 4 hours and found to be complete by the infrared spectrum of the product. Its molecular weight was calculated to be 1581. Its viscosity was measured at 24,000 cps.

Comparative Example A

Reaction Product of TMDI and 50% Polycaprolactone Acrylate, 50% Other Polyols

To 210 g (0.61 equivalents) of Tone M-100 polycaprolactone acrylate was added 500.7 g (1.214 equivalents) Tone 0210 polycaprolactone diol, 0.1 g dibutyltin dilaurate and 0.1 g BHT. The mixture was heated under an atmosphere of dry air to 50° C. and 189.6 g Vestanat TMDI (1.805 equivalents) was added so as to maintain the exotherm below 95° C. The reaction was held for 16 hours at 80° C. whereupon another 0.05 g dibutyltin dilaurate was added and the temperature raised to 85° C. After 24 hours at 85° C., 9 g of methanol was added. In another hour, no residual isocyanate was seen by infrared. Its molecular weight is calculated to be: Mn=2900 Mw=5000. Its viscosity was initially found to be greater than 100,000 cps but it could not be measured accurately because the material crystallized to a solid on standing. Inks prepared from it had viscosities that were unacceptably high.

Comparative Example B

Reaction Product of TMDI and 55% Polycaprolactone Acrylate, 45% Other Polyols

To 47.7 g (0.139 equivalents) of Tone M-100 polycaprolactone acrylate was added 114 g (0.228 equivalents) Priplast 3193 polyester diol from Uniqema, 0.1 g dibutyltin dilaurate, and 0.1 g BHT. The mixture was heated under an atmosphere of dry air to 50° C. and 38.15 g Vestanat TMDI (0.363 equivalents) was added so as to maintain the exotherm below 95° C. The reaction was held for 16 hours at 80° C. whereupon another 0.05 g dibutyltin dilaurate was added and the temperature raised to 85° C. After 24 hours at 85° C., 2 g of methanol was added. In another hour, no residual isocyanate was seen by infrared. Its molecular weight is calculated to be: Mn=2800 Mw=5000. Its viscosity was found to be greater than 100,000 cps. Inks prepared from it had viscosities that were unacceptably high.

Comparative Example C

Reaction Product of TMDI and 51% Polycaprolactone Acrylate, 49% Other Polyols

To 86.9 g (0.253 equivalents) of Tone M-100 polycaprolactone acrylate was added 20 g (0.44 equivalents) butanediol and 13.1 g (0.73 equivalents) Tone 0305 polycaprolactone triol. 0.1 g dibutyltin dilaurate and 0.1 g BHT were added and the mixture was heated under an atmosphere of dry air to 50° C. Through an addition funnel was added 80 g Vestanat TMDI (0.76 equivalents) so as to maintain the exotherm below 65° C. The reaction was held for 48 hours at 50° C. whereupon no residual isocyanate was seen by infrared. Its molecular weight is calculated to be: Mn=1700 Mw=2500. Its viscosity was found to be 210,000 cps. Inks prepared from it had viscosities that were unacceptably high.

Comparative Examples D

Hydroxy Acrylate Not Containing Polycaprolactone

To 234 g (1.614 equivalents) of hydroxybutyl acrylate was added 0.1 g dibutyltin dilaurate and 0.1 g BHT. The mixture was heated under an atmosphere of dry air to 60° C. and 166 g Vestanat TMDI (1.581 equivalents) was added so as to maintain the exotherm below 80° C. The reaction was held for 24 hours at 80° C. whereupon no residual isocyanate was seen by infrared. Its molecular weight is calculated to be: Mn=500 Mw=500. Its viscosity was found to be 2000 cps. While inks prepared from it had acceptable viscosities, adhesion was poor in the absence of polycaprolactone acrylate.

Comparative Example E

Hydroxy Acrylate Not Containing Polycaprolactone Acrylate

To 68.5 g (0.591 equivalents) of hydroxyethyl acrylate was added 44.5 g (0.247 equivalents) Tone 0305 polycaprolactone triol, 0.1 g dibutyltin dilaurate, and 0.1 g BHT. The mixture was heated under an atmosphere of dry air to 50° C. and 87 g Vestanat TMDI (0.829 equivalents) was added so as to maintain the exotherm below 80° C. The reaction was held for 48 hours at 50° C. whereupon no residual isocyanate was seen by infrared. Its molecular weight is calculated to be: Mn=775 Mw=2100. Its viscosity was found to be 51,000 cps. While inks prepared from it had acceptable viscosities, adhesion was marginal in the absence of polycaprolactone acrylate.

Comparative Example F

Polycaprolactone Triol Endcapped with IEM

To 1984 g Tone 0305 polycaprolactone triol (10.75 equivalents) were added 0.7 g dibutyltin dilaurate, and 1.75 g BHT. The mixture was heated to 50° C. and 1516 g (9.78 equivalents) Isocyanatoethyl methacrylate were added slowly with cooling so that the temperature did not exceed 65° C. After 18 hours at 50° C. and 8 hours at 60° C. there was no residual isocyanate seen in the infrared spectrum. Its molecular weight is calculated to be: Mn=975. Its viscosity was found to be 19,000 cps. While inks prepared from it had acceptable viscosities, the inks' cure and adhesion were poor.

EXAMPLE 9

Peformance Data

The adhesion characteristics of Samples 1–8 and Comparative Samples A–E to 3M High Intensity Sheeting and to Diamond Grade Sheeting were determined and the results are reported in the following tables. Clear coatings were prepared by mixing 30 parts by weight oligomer with 70 parts by weight tetrahydrofurfuryl acrylate and 4 parts Irgacure 651, a photoinitiator available from CIBA. Samples were coated using a #8 Meyer rod (R. D. Specialties, Webster, N.Y). Curing was carried out using a UV processor using medium pressure mercury lamps at about 200 to 240 mj/cm$^2$, 50 ft/mn, using an RPC UV processor (RPC Industries, Plainfield, Ill.), normal/normal settings, nitrogen purge. Adhesion was measured by a standard crosshatch adhesion test, ASTM D3359-95A Standard Test Methods for Measuring Adhesion by Tape Test, Method B. Mn, Mw, and % urethane nitrogen values are calculated from stoichiometry. Viscosity of the oligomers was measured at 25° C. on a Brookfield viscometer model LVT.

TABLE 1a

Performance Data for Samples 1–8

| Sample | Polycaprolactone Acrylate as Mole % of Hydroxyl Functional Compounds | Mn | Mw | Oligomer Viscosity, cps | % Urethane Nitrogen | $\eta_B$/Mn |
|---|---|---|---|---|---|---|
| 1 | 100% | 875 | 875 | 2500 | 3.1% | 3 |
| 2 | 89 | 1380 | 2100 | 9000 | 3.5% | 7 |
| 3 | 82 | 1600 | 5000 | 19500 | 3.6% | 12 |
| 4 | 79 | 1850 | 10000 | 40000 | 3.7% | 22 |
| 5 | 90 | 1255 | 2100 | 47000 | 3.4% | 37 |
| 6 | 89 | 1255 | 2100 | 11500 | 3.4% | 9 |
| 7 | 100 | 1614 | 1614 | 41000 | 2.6% | 25 |
| 8 | 100 | 1581 | 1581 | 24000 | 2.7% | 15 |

TABLE 1b

Performance Data for Samples 1–8

| Sample | Ink η at 25° C., cps | Ink η at 40° C., cps | Adhesion to 3M High Intensity Sheeting (polymethyl methacrylate) | Adhesion to 3M Diamond Grade Sheeting (polymethyl methacrylate) |
|---|---|---|---|---|
| 1 | 16 | 9 | 100 | 100 |
| 2 | 25 | 14 | 100 | 100 |
| 3 | 29 | 17 | 100 | 100 |
| 4 | 40 | 23 | 100 | 100 |
| 5 | 25 | 15 | 100 | 100 |
| 6 | 29 | 16 | 100 | 100 |
| 7 | 30 | 20 | 100 | 100 |
| 8 | 31 | 17 | 100 | 100 |

TABLE 2a

Performance Data for Comparative Examples A–E

| Sample | Polycaprolactone Acrylate as Mole % of Hydroxyl Functional Compounds | Mn | Mw | Oligomer Viscosity, cps | % Urethane Nitrogen | $\eta_B$/Mn |
|---|---|---|---|---|---|---|
| A | 50 | 2900 | 5000 | (Solid) | 2.8% | |
| B | 55 | 2800 | 5000 | 146,000 | 2.5% | 52 |
| C | 51 | 1700 | 2500 | 210,000 | 5.3% | 123 |
| D | 0 | 500 | 500 | 2000 | 5.5% | 4 |
| E | 0 | 775 | 2100 | 51000 | 5.9% | 65 |
| F | 0 | 975 | | 19,000 | 3.9% | 19 |

TABLE 2b

Performance Data for Comparative Examples A–E

| Sample | Ink η at 25° C., cps | Ink η at 40° C., cps | Adhesion to High Intensity Sheeting (polymethyl methacrylate) | Adhesion to Diamond Grade Sheeting (polymethyl methacrylate) |
|---|---|---|---|---|
| A | 102 | 55 | 100 | 100 |
| B | 68 | 37 | 100 | 100 |
| C | 45 | 25 | 100 | 100 |
| D | 10 | 6.5 | 50 | 0 |
| E | 25 | 13 | 100 | 50 |
| F | 17 | 9 | 0 | 0 |

EXAMPLE 10

A yellow millbase (Millbase 10) was prepared by combining 40 parts BAYER YELLOW Y5688, 25 parts SOLSPERSE 32000, and 35 parts THFFA. To prepare the millbase, the SOLSPERSE 32000 was dissolved in a mixture of the monomers. The pigment then was added to the solution and incorporated by mixing with a rotor-stator mixer. The dispersion was milled using a Netszch Mini-Zeta bead mill (available from Netzsch Inc. of Exton, Pa.) containing 0.5 mm zirconia media. The dispersion was processed for 45 minutes in the mill.

Oligomer A was prepared according to the following procedure: 281.3 g TONE M-100 polycaprolactone acrylate, available from Union Carbide Corp. of Danbury, Conn., (0.818 equivalents) was added to 0.040 g 2,6-di-tert-butyl-4-methyl phenol (BHT) and 1 drop dibutyltin dilaurate (both available from Aldrich Chemical Co. of Milwaukee, Wis.). This was heated with stirring under an atmosphere of dry air to 90° C. 84.2 g VESTANAT TMDI mixture of 2,2,4-trimethyl hexamethylene diisocyanate and 2,4,4-trimethylhexamethylene diisocyanate (0.80 equivalents), available from Creanova Inc. of Somerset, N.J., was added slowly, controlling the exotherm to under 100° C. with a water bath. The reaction was held at 90° C. for 8 hours, whereupon the IR spectrum showed no residual isocyanate. The Brookfield viscosity of the product was determined to be 2500 cP. The calculated molecular weight of this material was 875.

A yellow ink (Ink 10) was prepared from 20 parts Millbase 10, 30 parts Oligomer A, 33 parts THFFA (tetrahydrofurfuryl acrylate), 30 parts IBOA (isobornyl acrylate), 30 parts EEEA (2-(2-ethoxyethoxy)ethyl acrylate), 20 parts NVC (N-vinyl caprolactam), 10 parts HDDA (hexanediol diacrylate), 4 parts TINUVIN 292, 1.8 parts STABAXOL I, 0.2 parts IRGANOX 1035, 12 parts IRGACURE 819, 4 parts IRGACURE 651, 4 parts IRGACURE 369, 2 parts IPTX.

To 25 parts of the above Ink 4 was added 0.1 grams of SF96-100 flow agent to reduce the surface viscosity to 17.6 cP and surface tension to 23.5 dynes/cm.

The ink was printed using the x-y table using an MIT 30 pL printhead (currently available as XAAR XJ128-360 from XAAR Limited. A test pattern was printed at 317×285 dpi resolution onto 3M Company 180-10 vinyl film and 3M Company Diamond Grade (DG) sheeting. All films were cured using an RPC UV Processor (RPC Industries of Plainfield, Ill.) containing two 12" medium pressure mercury bulbs under the following conditions: Normal/Normal settings, 50 feet/min, nitrogen purge, 200–240 mJ/cm$^2$. The cured ink showed 100% adhesion on both substrates. Dot diameters of 122 microns on 180-10 vinyl and 160 microns on DG sheeting were observed.

EXAMPLE 11

Pigment Red 179 dispersion was prepared by blending 33 parts C.I. Pigment Red 179, 11 parts SOLSPERSE 32000, 28 parts EEEA and 28 parts IBOA.

Pigment Red 224 dispersion was prepared by blending 26 parts C.I. Pigment Red 224, 8.7 parts SOLSPERSE 32000, 32.65 parts EEEA and 32.65 IBOA.

The two dispersion were milled using a Netszch Mini-Zeta bead mill (available from Netzsch Inc. of Exton, Pa.) containing 0.5 mm zirconia media.

Pigment Red 179 dispersion (6.44 parts), 8.17 parts Pigment Red 224 dispersion, 10 parts of the oligomer prepared in Example 8, 5 parts EBECRYL 8800, 5 parts THFFA, 5 parts HDDA, 1.25 parts EEEA, 1.25 parts IBOA, 4 parts NVC, 1 part TINUVIN 292, 1.5 parts IRGACURE 819, 0.75 parts IRGACURE 651, 0.35 parts IRGACURE 369 and 0.25 parts IPTX were mixed and allowed to turn on rollers until well blended.

The resulting ink had shear viscosity of 144.2 centipoise as measured using the cup and bob geometry on a SR200 controlled stress rheometer (from Rheometric Scientific, Piscataway, N.J.). The ink had power law index of 0.98, and surface tension of 34.2 dynes/cm.

The ink was coated on CONTROLTAC PLUS GRAPHIC SYSTEM 180-10 film (available from 3M Company of St. Paul, Minn.) at about 11 micron wet thickness and cured in air using medium pressure mercury lamp at a dose of 297 mJ/cm$^2$.

The resulting prints show 100% adhesion with good mar resistance and excellent gloss.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A radiation curable ink jettable ink composition, comprising (A) from 1 to 40 percent by weight of an oligomer that is a reaction product of ingredients comprising:
   (a) an aliphatic polyisocyanate comprising two or more isocyanate groups;
   (b) a radiation curable alcohol comprising one or more radiation curable moieties, one or more hydroxyl moieties, and one or more polycaprolactone ester moieties; and
   (c) from 60 to 90 percent by weight of a radiation curable reactive diluent; and
(B) from about 0.5 to about 15 percent by weight pigment, wherein the viscosity of the ink composition is up to about 50 centipoise at 25° C. and wherein the ink composition is solvent free.

2. The ink composition of claim 1, wherein the ink composition comprises at least 20 percent by weight of the oligomer.

3. The ink composition of claim 1, wherein the molar ratio of hydroxyl groups of the radiation curable alcohol to the isocyanate groups of the polyisocyanate is at least about 1.

4. The ink composition of claim 1, wherein the ingredients of the oligomer further comprise one or more polyols in an amount such that at least 75% of the hydroxyl groups incorporated into the oligomer are from the radiation curable alcohol.

5. The ink composition of claim 1, wherein the radiation curable alcohol has the formula wherein n has a range from about 1–10, preferably from about 2 to 5 such that the radiation curable alcohol is soluble in a reactive diluent; and R is a monovalent substituent.

6. The ink composition of claim 1, wherein n is about 2.

7. The ink composition of claim 1, wherein the polyisocyanate comprises 2,2,4-trimethylhexamethylene diisocyanate.

8. The ink composition of claim 1, wherein the polyisocyanate comprises 2,4,4-trimethylhexamethylene diisocyanate.

9. The ink composition of claim 1, wherein the polyisocyanate comprises a mixture of 2,2,4-trimethylhexamethylene diisocyanate and 2,4,4-trimethylhexamethylene diisocyanate.

10. The ink composition of claim 1, wherein the polyisocyanate comprises isophorone diisocyanate.

11. The ink composition of claim 1, wherein the polyisocyanate is a mixture comprising, on a relative basis, (a) 1 to 19 parts by weight of at least one of 2,2,4-trimethylhexamethylene diisocyanate and 2,4,4-trimethylhexamethylene diisocyanate and (b) 1 to 19 parts by weight of at least one of isophorone diisocyanate and/or an isocyanate functional isocyanurate.

12. The ink composition of claim 1, wherein the polyisocyanate comprises an isocyanurate moiety.

13. The ink composition of claim 1, wherein the polyisocyanate comprises a compound of the formula wherein each R is independently an n+1 valent moiety and each n independently is 1 to 3.

14. The ink composition of claim 1, wherein the composition when cured has an elongation in the range of 50% to 300%.

15. The ink composition of claim 1, wherein the composition has a surface tension in the range of 22 to 40 dynes/cm.

16. The ink composition of claim 1, wherein the radiation curable oligomer has a viscosity to mass index below about 25:1.

17. A printing ink with an ink jettable viscosity, said printing ink comprising from 60 to 90 percent by weight of a reactive diluent, from 1 to 40 percent by weight of a radiation curable polyester urethane oligomer, and from about 0.5 to about 15 weight percent pigment, wherein the oligomer is a reaction product of ingredients comprising a polyisocyanate and a radiation curable, polyester alcohol, said alcohol comprising at least one radiation curable moiety, at least one hydroxyl group, and one or more polycaprolactone moieties, wherein the ink jettable viscosity of the ink is up to about 50 centipoise at 25° C and wherein the ink composition is solvent free.

18. The printing ink of claim 17, wherein the radiation curable polyester urethane oligomer has a viscosity to mass index below about 25:1.

19. A printing method, comprising the steps of:
   (a) ink jetting a radiation curable ink having a viscosity of up to about 50 centipoise at 25° C. onto a receiving substrate to form at least one printed feature, wherein the radiation curable ink comprises a reactive diluent, pigment, and a radiation curable, polyester urethane oligomer, wherein the oligomer is a reaction product of ingredients comprising a polyisocyanate and a radiation curable polyester alcohol; and
   (b) exposing the printed feature to a curing amount of radiation.

20. The method of claim 19, wherein the radiation curable polyester urethane oligomer has a viscosity to mass index below about 25:1.

21. The method of claim 19 wherein the ink composition is solvent free.

22. The method of claim 19 wherein the ink composition comprises at least about 60 to 90 percent by weight of the reactive diluent, 1 to 40 percent by weight of the oligomer, and from about 0.5 to about 15 percent by weight pigment.

23. The method of claim 19 wherein the polyisocyanate comprises an isocyanurate moiety.

24. The method of claim 19 wherein the polyisocyanate comprises a compound of the formula wherein each R is independently an n+1 valent moiety and each n independently is 1 to 3.

25. A printing method, comprising the steps of:
(a) ink jetting a radiation curable ink having a viscosity of up to about 50 centipoise at 25° C. onto a receiving substrate to form at least one printed feature, wherein the ink comprises:
  (i) a radiation curable, polyester urethane oligomer that is a reaction product of ingredients comprising an aliphatic polyisocyanate and a radiation curable alcohol, said alcohol comprising one or more radiation curable moieties, one or more hydroxyl moieties, and one or more polycaprolactone moieties;
  (ii) a sufficient amount of a reactive diluent such that the ink has an ink jettable viscosity; and
  (iii) pigment; and
(b) exposing the printed feature to a curing amount of radiation.

26. The method of claim 25 wherein the ink composition is solvent free.

27. The method of claim 25 wherein the ink composition comprises at least about 60 to 90 percent by weight of the reactive diluent, 1 to 40 percent by weight of the oligomer, and from about 0.5 to about 15 percent by weight pigment.

28. The method of claim 25 wherein the polyisocyanate comprises an isocyanurate moiety.

29. The method of claim 25 wherein the polyisocyanate comprises a compound of the formula wherein each R is independently an n+1 valent moiety and each n independently is 1 to 3.

* * * * *